(12) United States Patent
Ishii et al.

(10) Patent No.: US 7,826,721 B2
(45) Date of Patent: Nov. 2, 2010

(54) OPTICAL DISC RECORDING APPARATUS AND METHOD, AND DISC RECORDING APPARATUS WITH CAMERA

(75) Inventors: Toshisada Ishii, Tokyo (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 1347 days.

(21) Appl. No.: 11/313,798

(22) Filed: Dec. 22, 2005

(65) Prior Publication Data

US 2006/0146667 A1 Jul. 6, 2006

(30) Foreign Application Priority Data

Jan. 5, 2005 (JP) ............................. 2005-000890

(51) Int. Cl.
H04N 5/00 (2006.01)
(52) U.S. Cl. ...................... 386/126; 369/47.1; 369/53.2
(58) Field of Classification Search ................. 386/126; 369/53.2, 47.1
See application file for complete search history.

(56) References Cited

U.S. PATENT DOCUMENTS

2003/0152369 A1* 8/2003 Isobe et al. .................. 386/95
2004/0022519 A1* 2/2004 Lee ............................. 386/52
2004/0047595 A1* 3/2004 Matsuura et al. ............. 386/67

FOREIGN PATENT DOCUMENTS

| EP | 0 920 020 A1 | 6/1999 |
| EP | 1 296 326 A1 | 3/2003 |
| EP | 1 316 960 A1 | 6/2003 |
| JP | 11-86418 | 3/1999 |
| JP | 2002-318598 | 10/2002 |
| JP | 2003-134457 | 5/2003 |
| JP | 2003-242751 | 8/2003 |
| JP | 2003-308675 | 10/2003 |

* cited by examiner

*Primary Examiner*—Thai Tran
*Assistant Examiner*—Girumsew Wendmagegn
(74) *Attorney, Agent, or Firm*—Oblon, Spivak, McClelland, Maier & Neustadt, L.L.P.

(57) ABSTRACT

The present invention has been made to increase the number of times of imaging operation in the case where a DVD+RW is used as a recording medium. The present invention provides an optical disc recording apparatus that records data onto an optical disc that adopts a format in which title and chapter are specified as data management units, the title being a playback unit of contents recorded in contiguous physical areas and the chapter being a unit obtained by dividing the title into a plurality of pieces, which includes a record unit that receives contents data as an input, encodes the contents data into a data stream compatible with the format, and records the encoded data stream onto the optical disc, and a control unit that controls recording processing for the optical disc, wherein the control unit records new contents data onto the optical disc in the physical area continuing from the last title of all recorded titles as a chapter continuing from the last chapter included in the last title.

14 Claims, 8 Drawing Sheets

OPTICAL DISC RECORDING APPARATUS AND METHOD, AND DISC RECORDING APPARATUS WITH CAMERA

CROSS REFERENCE TO RELATED APPLICATIONS

The present invention contains subject matter related to Japanese Patent Application JP 2005-000890 filed in Japanese Patent Office on Jan. 5, 2005, the entire contents of which being incorporated herein by reference.

BACKGROUND OF THE INVENTION

1. Field of the Invention

The present invention relates to an optical disc recording apparatus and method that record data onto, for example, an optical disc such as DVD, and a disc recording apparatus with camera.

2. Description of the Related Art

In recent years, DVD-RW and DVD+RW serving as record-type DVDs are frequently used as a recording medium for consumer video cameras.

DVD-RW and DVD+RW are optical discs having a diameter of 12 cm and a thickness of 1.2 mm and having a single-side capacity of 4.7 Gbytes. DVD-RW is a disc proposed by the "DVD forum" (refer to, for example, DVD forum official site [searched on Dec. 16, 2004,]<URL:http:// www. dvdforum.org/>) which is a non-government specifications-setting body. DVD+RW is a disc proposed by the "DVD+RW alliance" (refer to, for example, DVD+RW alliance official site [searched on Dec 16, 2004,]<URL:http:// www.dvdrw.com/>) which is a non-government specifications-setting body different from the DVD forum.

Both the DVD-RW and DVD+RW formats are compatible with a playback-only DVD format (DVD-VIDEO) specified by the "DVD forum". The contents of the DVD-RW and DVD+RW can be played back by means of a playback-only DVD player.

In the DVD-VIDEO specification proposed by the DVD forum, a unit called "Title" is specified as a data unit. "Title" specified in the DVD-VIDEO specification is a concept representing a playback unit of one content corresponding to, for example, one piece of film or music album. The DVD-VIDEO specification specifies that up to 99 titles can be recorded onto one DVD disc.

In order to retain compatibility with the DVD-VIDEO specification, DVD-RW and DVD+RW also use the unit called "Title" to manage recorded contents. One DVD-RW disc can record up to 99 titles and one DVD+RW disc can record up to 49 titles.

SUMMARY OF THE INVENTION

In a DVD recorder that uses DVD-RW and DVD+RW as a recording medium, video image content generated by a single recording operation (operation from depression of recording start button to depression of stop button) is assigned to one title. Accordingly, additional recording operation cannot be performed after a given number of recording operations have been performed for one disc irrespective of whether there is free space or not. In the case of DVD+RW format, for example, only 49 times of recording operations can be performed for one disc.

This problem does not apply to the case of recording TV programs. Because a single recording operation allows long time (such as one or two hours) recording, so that the free space of the disc runs out before the number of times of recording has reached a given number.

However, in the case where a consumer video camera is used to perform shooting, the time needed to complete a single shooting (time from depression of recording start button to depression of stop button) is relatively small and the shooting operation is generally repeated plenty of times, unlike the case of the recording of TV programs.

Therefore, in the case where DVD-RW and DVD+RW are used as a recording medium of the consumer video camera, the number of titles may reach a given number although a large amount of free space is left on the disc due to particularity of the shooting operation, to thereby disable additional recording.

This becomes a bigger problem for DVD+RW since it can record only 49 titles.

The present invention has been made to solve the above problem and it is desirable to provide an optical disc recording apparatus and method, and a disc recording apparatus with camera capable of performing a much more number of recording or shooting operations in the case where contents are recorded onto an optical disc using a format in which the "Title" is specified as a management unit of the rerecorded contents, to thereby effectively utilize the recording area of the optical disc.

According to the present invention, there is provided an optical disc recording apparatus that records data onto an optical disc that adopts a format in which title and chapter are specified as data management units, the title being a playback unit of contents recorded in contiguous physical areas and the chapter being a unit obtained by dividing the title into a plurality of pieces, including: a record means for receiving contents data as an input, encoding the contents data into a data stream compatible with the format, and recording the encoded data stream onto the optical disc; and a control means for controlling recording processing for the optical disc, wherein the control means records new contents data onto the optical disc in the physical area continuing from the last title of all recorded titles as a chapter continuing from the last chapter included in the last title.

According to the present invention, there is provided an optical disc recording method that encodes contents data and records the encoded contents data onto an optical disc that adopts a format in which title and chapter are specified as data management units, the title being a playback unit of contents recorded in contiguous physical areas and the chapter being a unit obtained by dividing the title into a plurality of pieces, including the step of: recording new contents data onto the optical disc in the physical area continuing from the last title of all recorded titles as a chapter continuing from the last chapter included in the last title.

According to the present invention, there is provided a disc recording apparatus with camera including: an imaging means for shooting a subject and encoding the obtained video image signal using a predetermined encoding mode; and a disc recording means for recording the imaging data generated by the imaging means onto an optical disc, wherein the disc recording means records data onto an optical disc that adopts a format in which title and chapter are specified as data management units according to the format, the title being a playback unit of contents recorded in contiguous physical areas and the chapter being a unit obtained by dividing the title into a plurality of pieces, and in the case where imaging operation is started by the imaging means, the disc recording means records the imaging data onto the optical disc in the physical area continuing from the last title of all recorded titles as a chapter continuing from the last chapter included in the last title.

In the present invention, new contents data is recorded onto an optical disc in the physical area continuing from the last title of all recorded titles as a chapter continuing from the last chapter included in the last title.

As a result, in the present invention, it is possible to perform a much more number of recording or shooting operations in the case where contents data are recorded onto an optical disc that adopts a format in which title is specified as a management unit of recorded contents to thereby effectively utilize the recording area of the optical disc.

DETAILED DESCRIPTION OF THE PREFERRED EMBODIMENTS

A DVD recording apparatus with camera (hereinafter, referred to as merely "video camera") to which the present invention has been applied will be described below.

Figure 1:
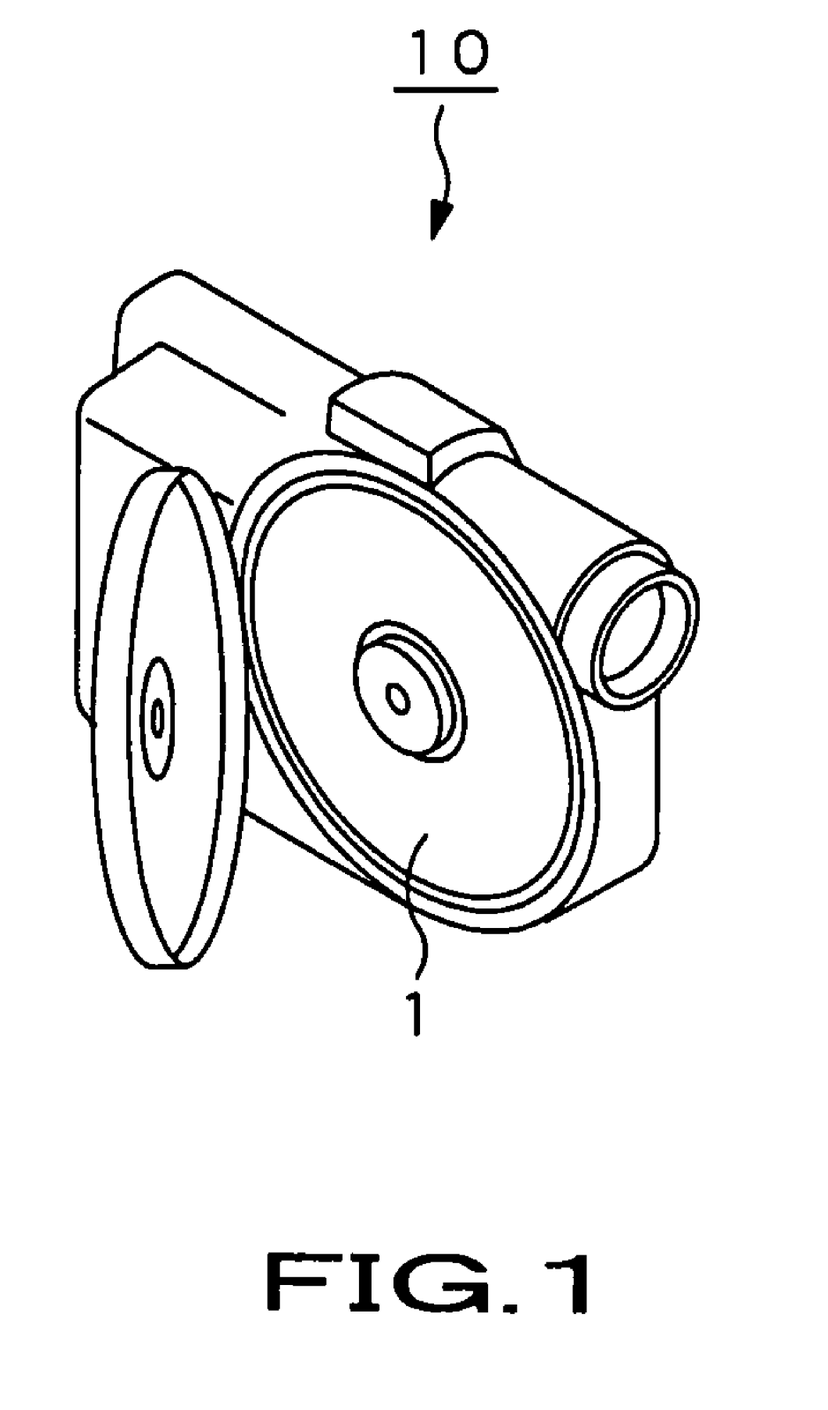
FIG. 1 is a perspective view showing the outer appearance of a video camera according to the present invention.

FIG. 1 is a perspective view showing the outer appearance of a video camera 10 according to the present invention.

As shown in FIG. 1, the video camera 10 is a video image pickup apparatus whose size is so small that it can be carried by one hand. The video camera 10 includes a camera apparatus and a DVD recording apparatus which are integrally formed. That is, the video camera 10 shoots video images to generate video and audio signals, compresses/encodes the generated video and audio signals according to MPEG-1 or MPEG-2, and records the resultant signals onto a DVD which is an optical disc medium.

The recording medium that the video camera 10 uses here is a DVD+RW disc 1.

The DVD+RW disc 1 is an optical disc having a diameter of 12 cm and a thickness of 1.2 mm and having a single-layer capacity of 4.7 Gbytes. The DVD+RW disc 1 is a disc compliant with a format proposed by the "DVD+RW alliance" which is a non-government specifications-setting body and compatible with a playback-only DVD format (DVD-VIDEO) specified by the "DVD forum".

DVD+RW Format

Firstly, the recording format of DVD+RW will be described.

Figure 2:
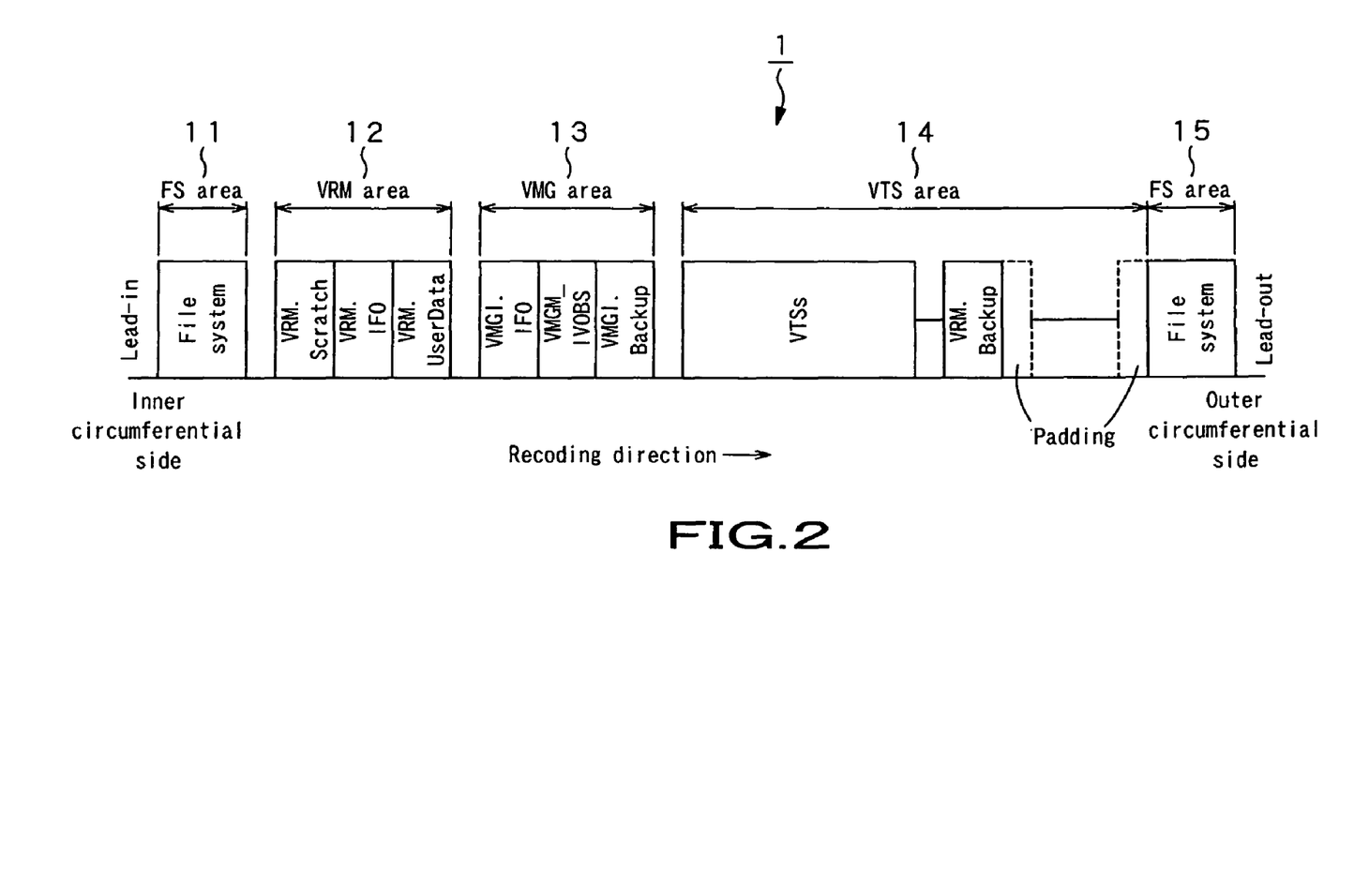
FIG. 2 is a view showing recording positions of respective files in the case where contents data is recorded onto the DVD+RW disc.

FIG. 2 shows recording positions of respective files in the case where contents data is recorded onto the DVD+RW disc 1.

As shown in FIG. 2, a first FS area 11, a VRM area 12, a VMG area 13, a VTS area 14, and a second FS area 15 are formed on the recording area of the DVD+RW disc 1 from the inner circumferential side (Lead-in side) of the disc 1 toward the outer circumferential side (Lead-out side) thereof.

A UDF (Universal Disc Format) file system is recorded in the first and second FS area 11 and 15. The UDF file system is information for managing all files recorded in the recording area of the disc and holds information such as starting position, size, file name, recording date and time of each file. The first FS area 11 is formed on the innermost circumference of the disc, and the second FS area 15 is formed on the outermost circumference thereof.

The VRM area 12 is formed outside the first FS area 11. VRM. Scratch, VRMI (Video Recording Manager Information) and VRM UserData which are not specified by the DVD-VIDEO specification, but are independently specified by the DVD+RW specification are recorded in the VRM area 12. Management information related to title and the like is recorded in the VRMI. More specifically, the VRMI holds positions of actual data of respective titles which are recorded in the VTS area 14, recording date and time of the titles, names of the titles, disc name, protect information (information indicating whether the title is prevented from being erased or overwritten), and the like.

The VMG area 13 is formed outside the VRM area 12. VMG (Video Manager) specified by the DVD-VIDEO specification is recorded in the VMG area 13. The VMG includes menu data (MPEG-2 datum and management control data) for displaying and controlling a menu screen serving as a user interface screen for playing back information such as record addresses of respective VTSes, the number of VTSes, and titles which are recorded in the VTS area 14.

More specifically, the VMG is constituted by VMGI, VMGM_VOBS, and VMGI Backup. The VMGM_VOBS holds actual data (MPEG-2 data, etc.) of the menu data. The VMGI holds management data for playing back the menu data while controlling the menu screen. The VMGI Backup is backup data of the VMGI.

The VTS area 14 is formed outside the VMG area 13.

Figure 3:
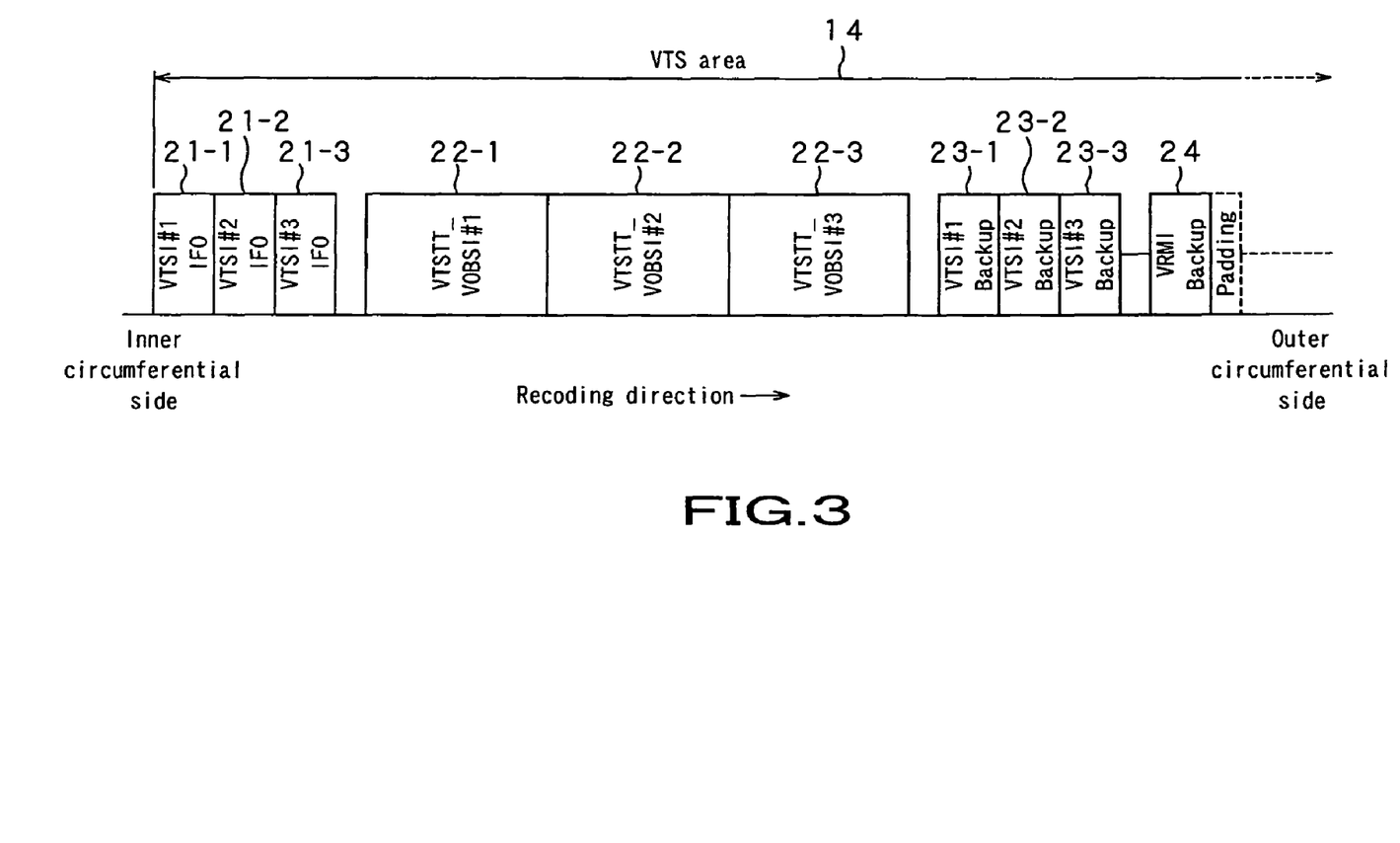
FIG. 3 is a view showing information recorded on VTS area and its recorded positions.

As shown in FIG. 3, VTS (Video Title Set) specified by the DVD-VIDEO specification and VRMI Backup which is backup data of the VRMI are recorded in the VTS area 14.

In the case of DVD+RW, the VTS serves as a management unit of titles and is constituted by management data and actual data.

In the case of DVD+RW, 1 to 3 VTSes are generated in the VTS area 14 depending on the encoding method applied to the respective titles. That is, in the case where a single encoding method is applied to all titles, one VTS is generated. In the case where there are titles to which three different encoding methods have been applied on the disc, three VTSes are generated.

As shown in FIG. 3, each VTS is constituted by VTSI#n21-n, VTSTT_VOBS#n22-n, and VTSI#n Backup23-n, where "n" is an integer from 1 to 3 indicating the VTS number.

The VTSI#n21-n is a file including management information related to corresponding VTS. More specifically, the VTSI#n21-n holds name of the title managed in the corresponding VTS, recording position of the title, recording time of the title, the number of chapters included in the title, names of the chapters, recording start positions of chapters, and the like.

The VTSTT_VOBS#n22-n is actual data of the VTS, that is, a file including encoded video and audio data.

The VTSI#n Backup23-n is backup data of the VTSI#n21-n.

In the DVD+RW, management information of VTSI# 121-1 to VTSI#321-3 are collectively recorded in the leading part of the VTS area 14. The recording of the VTST-T_VOBS#1 is started at a predetermined fixed address within the VTS area 14.

Further, VRMI Backup 24, which is backup data of VRMI 42, is recorded in the area immediately outside the VTSI#n Backup23-n.

In addition, a predetermined amount of padding data are recorded in the area immediately outside the VRMI Backup 24, that is, the last part (immediately before the second FS area 15) of the VTS area 14.

Title and Chapter

A relationship among VTS, title, and chapter in the DVD-VIDEO specification will next be described.

Figure 4:
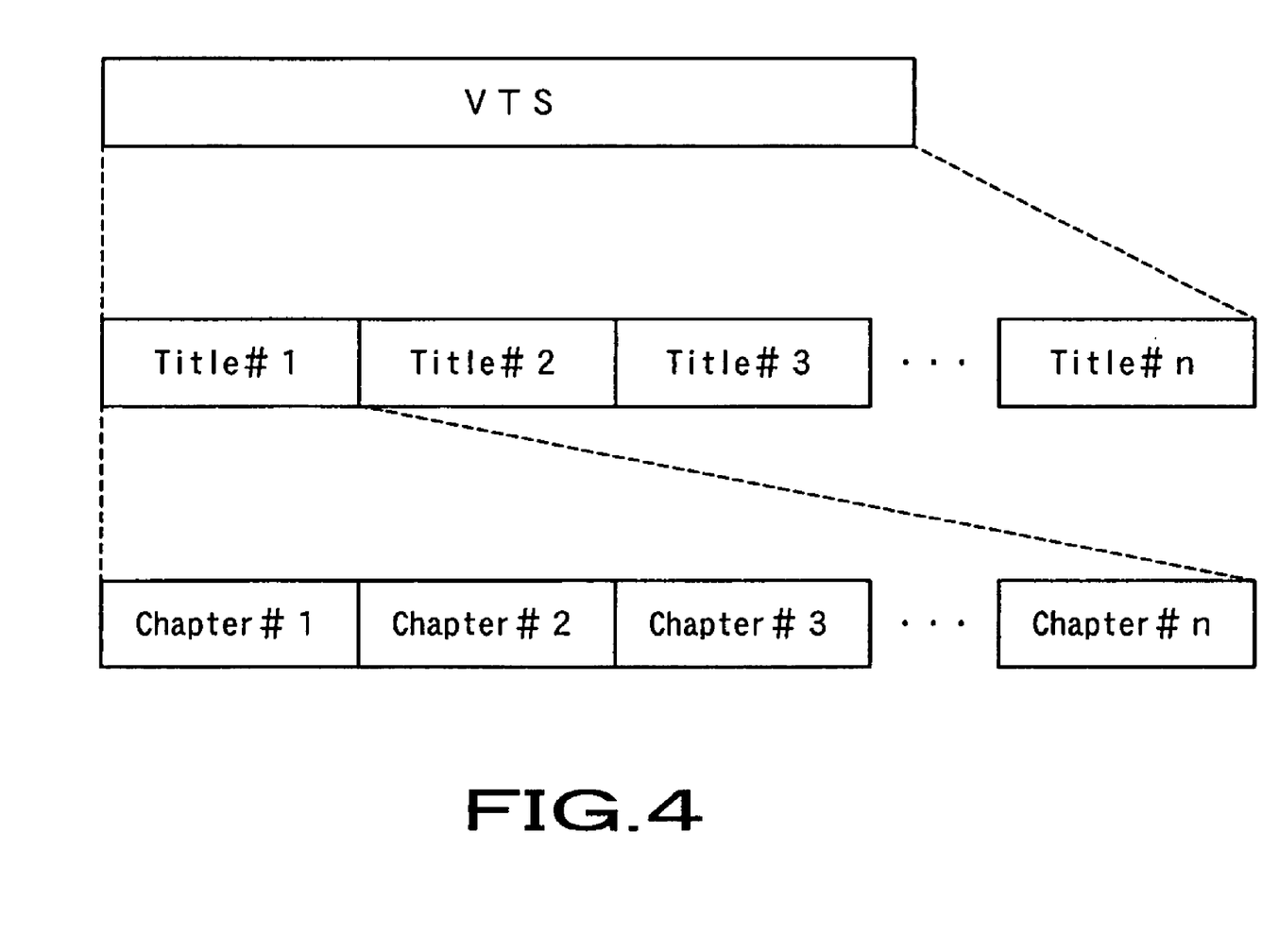
FIG. 4 is a view showing a relationship among VTS, title, and chapter.

FIG. 4 is a view showing a relationship among VTS, title and chapter.

The DVD-VIDEO specification manages contents to be recorded by playback units called "Title" and "Chapter".

"Title" is a concept representing a playback unit of one content corresponding to, for example, one piece of film or music album. The DVD+RW also manages contents by the unit called "Title" so as to retain compatibility with the DVD-VIDEO specification. One DVD+RW disc can record up to 49 titles.

The VTS is a management unit including a plurality of such titles. In the DVD+RW, up to three VTSes are generated. In the DVD+RW, the title that has been encoded using MPEG-1 is included in a first VTS (VTS#1); the title that has been encoded using half mode (352 horizontal lines) of MPEG-2 is included in a second VTS (VTS#2); and the title that has been encoded using standard mode (720 horizontal lines) of MPEG-2 is included in a third VTS (VTS#3).

The DVD-VIDEO specification, which is originally intended for DVD-ROM (read only) specification, states that "data constituting the title that needs to be seamlessly played back without interruption must be recorded in physically contiguous recording areas". In other words, it states that "data constituting the title that needs to be seamlessly played back should not be recorded over a plurality of recording areas with non-recording areas or data of other titles interposed therebetween".

Further, in the DVD-VIDEO specification proposed by the DVD forum, a unit called "Chapter" is specified. The "Chapter" specified in this specification is a unit obtained by dividing one title into a plurality of pieces and set in order to make it easier to perform searching and the like. In the DVD-VIDEO specification, up to 99 chapters can be recorded in one title.

Therefore, in the case where contents are recorded onto DVD+RW disc compatible with the DVD-VIDEO specification, video and audio encoded data generated by a single recording operation (operation from depression of recording start button to depression of stop button) are organized into one title in a commonly used DVD recorder (apparatus other than the video camera 10 of the present invention). Further, in the commonly used DVD recorder (apparatus other than the video camera 10 of the present invention), one chapter is switched to another in timing with, for example, a shift of scene.

Configuration and Operation of Video Camera 10

An internal configuration and recording operation of the video camera 10 will next be described.

Figure 5:
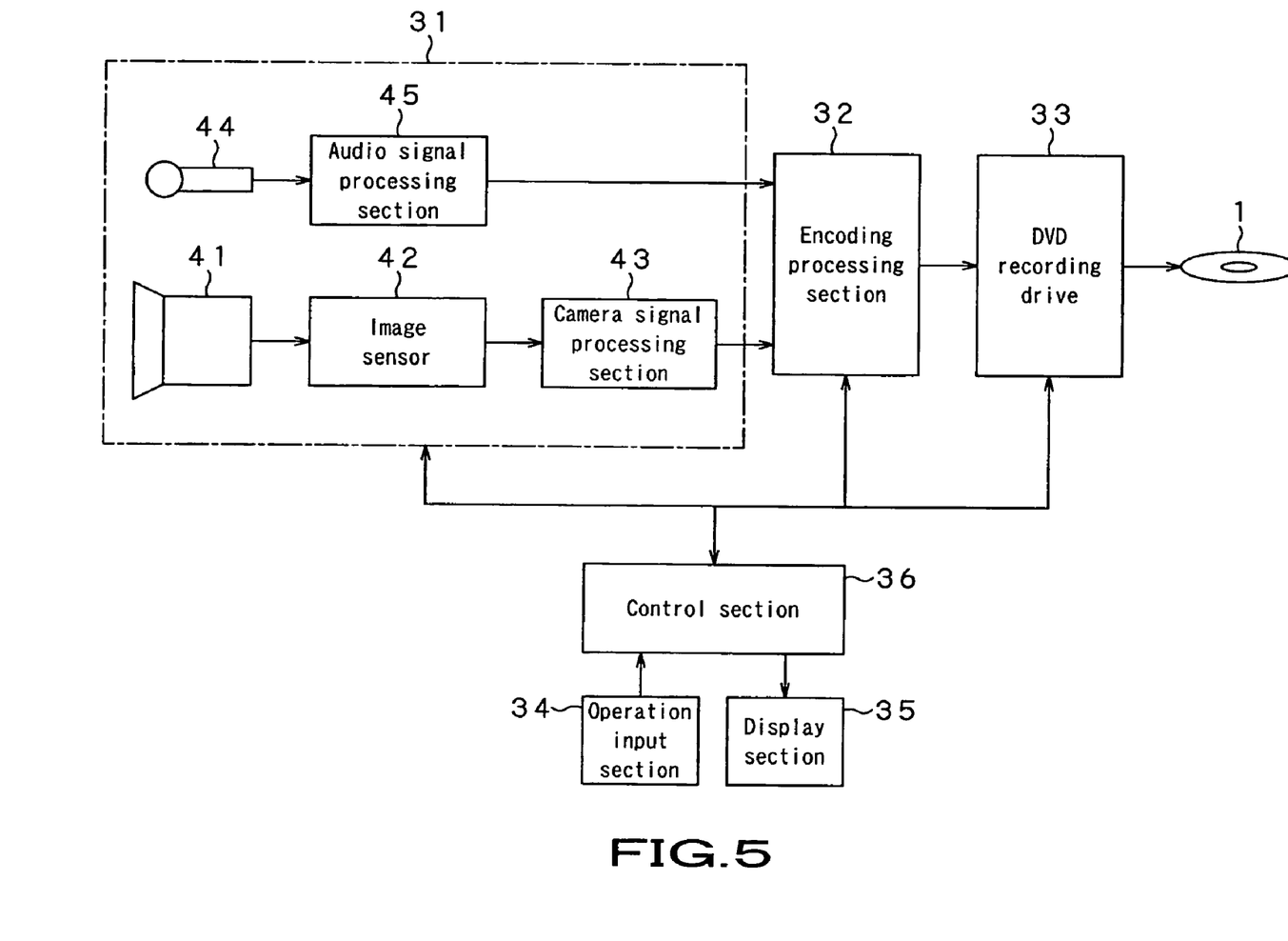
FIG. 5 is a block diagram showing a configuration of the video camera according to the present invention.

FIG. 5 is a block diagram showing a configuration of the video camera 10.

As shown in FIG. 5, the video camera 10 includes a camera section 31, a encoding processing section 32, a DVD recording drive 33, an operation input section 34, a display section 35, and a control section 36.

The camera section 31 includes an optical system 41 to which a light from a subject is converged, an image sensor 42 that receives an image light of the subject through the optical system 41 and converts it into an image signal, a camera signal processing section 43 that applies various signal processing to the image signal generated by the image sensor 42 to generate a digital video image signal, a microphone 44 that detects external sound and converts it into an audio signal, and an audio processing section 45 that applies digitization processing and the like to the audio signal detected through the microphone 44 to generate a digital audio signal.

The encoding processing section 32 encodes the video image signal and audio signal output from the camera section 31 using MPEG-1 or MPEG-2 encoding method.

The DVD recording drive 33, to which the DVD+RW disc 1 is attached or detached, is an apparatus that records data onto the disc 1 in a state where the disc 1 is attached thereto.

The operation input section 34 is a user interface including a recording start button, a recording stop button, and the like and is provided at the outer part of the video camera 10.

The display section 35 is a finder that presents an image being shot to a user.

The control section 36 controls the camera section 31, encoding processing section 32, operation input section 33, and display section 35. Further, at the time when contents and the like are recorded onto the DVD+RW disc 1, the control section 36 generates various management control information specified by DVD+RW format. Further, the control section 36 controls the recording address such that MPEG-2 data generated by the encoding processing section 32 and management control information generated by the control section 36 are recorded in a given physical location onto the disc 1 according to the DVD+RW format.

The shooting operation of the video camera 10 having the above configuration is as follows.

Upon depression of the recording start button of the operation input section 34 by a user, the video camera 10 allows the encoding processing section 32 to encode the video image signal and audio signal being output from the camera section 31 using a predetermined encoding method such as MPEG-1 or MPEG-2. The control section 34 records the encoded data generated by the encoding processing section 32 and management control information onto the DVD+RW disc 1 according to its format. Upon depression of the recording stop button of the operation input section 34 by the user, the video camera 10 stops shooting and recording operations.

Title Management Method Used in Video Camera 10

A title management method that the video camera 10 according to the present invention uses at the shooting time will next be described.

In the case where new encoded data is recorded onto the DVD+RW disc 1 in the video camera 10 according to the present invention, the new encoded data is recorded in the physical area that continues from encoded data of a most recently recorded title (hereinafter referred to as "last title") in principle, the new encoded data being recorded as a new chapter included in the last 'title.

That is, in the video camera 10, new encoded data generated by imaging processing is recorded not as one independent title but as content that continues from the tail end of the last title in principle. At this time, a chapter number is assigned to the content. In the DVD+RW, sequence number is assigned to chapters in ascending order from 1 and new encoded data is recorded as a chapter that continues from the last chapter in the last title.

However, the processing that additionally records new encoded data in the last title to update only a chapter structure is just a principle, and exceptionally the new encoded data is recorded as a new title onto the DVD+RW disc in the following cases (1) to (5).

(1) The case where the number of chapters included in the last title has already reached the maximum number (99) specified by the DVD+RW specification and thereby it is impossible to increase the number of chapters in the last title.

(2) The case where the VTS needs to be switched: that is, the case where video encoding mode (MPEG-1, MPEG-2 (half mode), MPEG-2 (standard mode)) is different between the last title and new encoded data.

(3) The case where audio encoding method is different between the last title and new encoded data: for example, the case where audio encoding method is changed from AC3 (2 ch) to AC3 (5.1 ch).

(4) The case where the last title has not been recorded by own apparatus but by another apparatus.

(5) The case where the last title is protected (a state where the title is prevented from being erased or overwritten).

The above determination is made by the control section 36 at the shooting start time. The concrete determination processing will be described below with reference to process flows shown in FIGS. 6 and 7.

Figure 6:
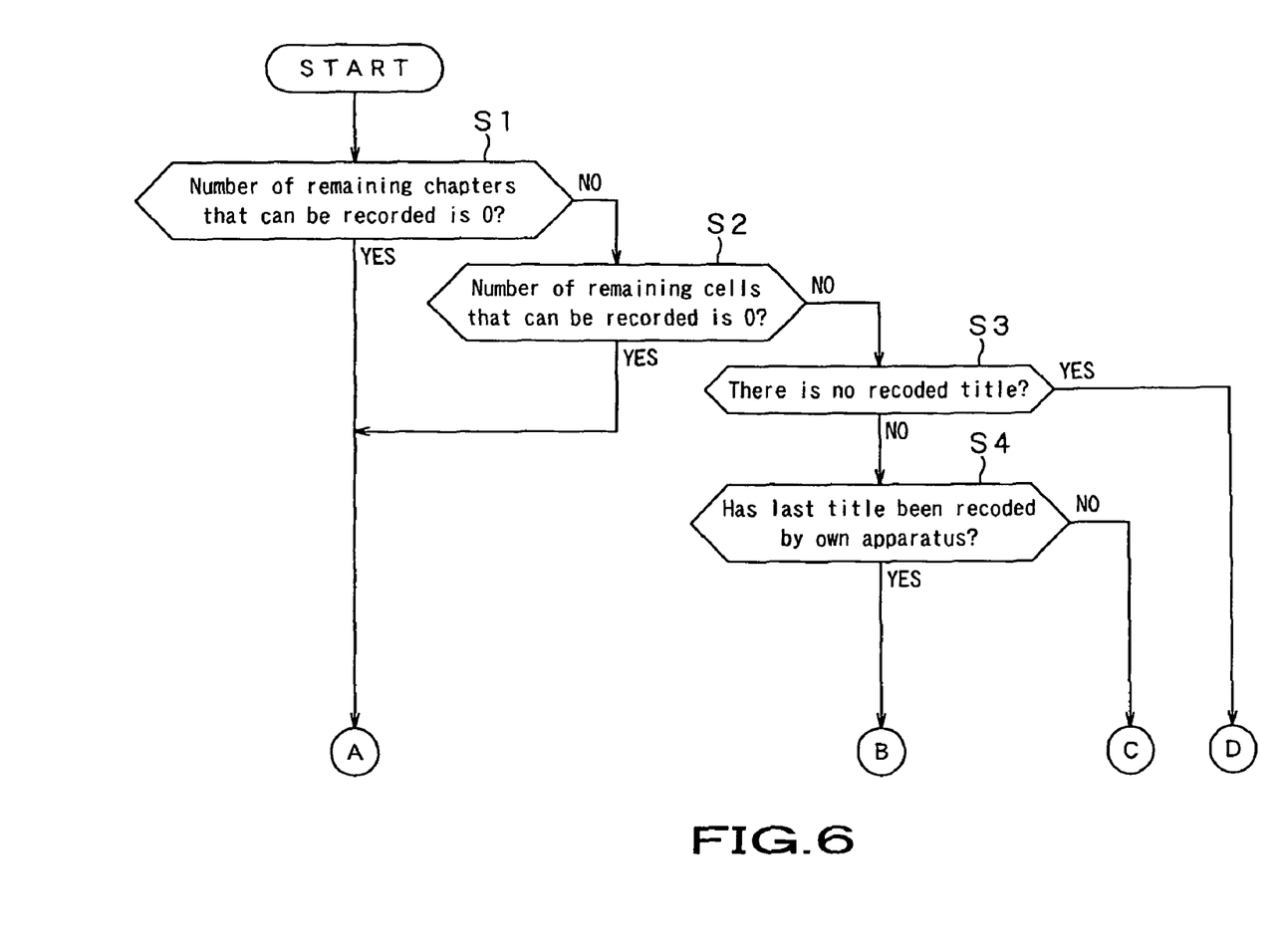
FIG. 6 is a flowchart showing the processing that a control section performs at the shooting start time.

Upon depression of the recording start button, the control section 36 performs processing starting from step S1 described below.

Firstly, in step S1, the control section 36 refers to the total number of chapters included in all titles recorded on the DVD+RW disc 1 being attached and determines whether the number of remaining chapters that can be recorded onto the DVD+RW 1 is 0. In the case where the number of chapters included in one DVD+RW disc has exceeded a predetermined number (254, etc.), additional recording of the chapter cannot be performed. Therefore, the control section 36 determines whether the total number of chapters has exceeded a predetermined number (254, etc.) in step S1. When determining that the number of remaining chapters that can be recorded is 0 (Yes in step S1), the control section 36 advances to step S11 and performs record cancel processing. When determining that the number of remaining chapters that can be recorded is not 0 (No in step S1), the control section 36 advances to step S2.

In step S2, the control section 36 refers to the total number of cells in the DVD+RW disc 1 being attached and determines whether the number of remaining cells that can be recorded onto the DVD+RW 1 is 0. In the case where the number of cells included in one DVD+RW disc has exceeded a predetermined number (254, etc.), additional recording of the cell cannot be performed. Therefore, the control section 36 determines whether the total number of cells has exceeded a predetermined number (254, etc.) in step S2. When determining that the number of remaining cells that can be recorded is 0 (Yes in step S2), the control section 36 advances to step S11 and performs record cancel processing. When determining that the number of remaining chapters that can be recorded is not 0 (No in step S2), the control section 36 advances to step S3.

In step S3, the control section 36 determines whether there is any title recorded onto the DVD+RW disc 1 or not. That is, in step S3, the control section 36 determines whether the DVD+RW disc 1 is a disc immediately after being formatted or not, or a disc immediately after all data therein has been deleted or not. When determining that there is no recorded title (Yes in step S3), the control section 36 advances to step S14 and performs initial recording processing. When determining that there is any recorded title (No in step S3), the control section 36 advances to step S4.

In step S4, the control section 36 determines whether the last title (most recently recorded title among all recorded titles) in the DVD+RW disc 1 being attached has been recorded by own apparatus. That is, in step S4, determination of the above case (4) is made. When determining that the last title has not been recorded by own apparatus, in other words, recorded by another apparatus (No in step S4), the control section 36 advances to determination processing of the total number of titles (step S9). When determining that the last title has been recorded by own apparatus (Yes in step S4), the control section 36 advances to step S5.

In step S5, the control section 36 determines whether the encoding mode of the video image of the last title and that of the video image to be newly recorded after completion of shooting operation correspond to each other. That is, in step 5, determination of the above case (2) is made. When determining that the video encoding modes do not correspond to each other (No in step S5), the control section 36 advances to determination processing of the total number of titles (step S9). When determining that the video encoding modes correspond to each other (Yes in step S5), the control section 36 advances to step S6.

In step S6, the control section 36 determines whether the encoding method of the audio data of the last title and that of the audio data to be newly recorded after completion of shooting operation correspond to each other. That is, in step 6, determination of the above case (3) is made. When determining that the audio encoding methods do not correspond to each other (No in step S6), the control section 36 advances to determination processing of the total number of titles (step S9). When determining that the audio encoding methods correspond to each other (Yes in step S6), the control section 36 advances to step S7.

In step S7, the control section 36 refers to the number of chapters in the last title recorded on the DVD+RW disc 1 being attached and determines whether the number of chapters in the last title is the maximum number (99). That is, in step S7, determination of the above case (1) is made.

When determining that the number of chapters in the last title is the maximum number (99) (Yes in step S7), the control section 36 advances to determination processing of the total number of titles (step S9). When determining that the number of chapters in the last title is not the maximum number (99) (No in step S7), the control section 36 advances to step S8.

In step S8, the control section 36 determines whether the last title is protected (state where the title is prevented from being erased or overwritten). That is, in step S8, determination of the above case (5) is made. When determining that the last title is protected (Yes in step S8), the control section 36 advances to step S12 and performs recording processing with another title name. When determining that the last title is not protected (No in step S8), the control section 36 advances to step S13 and performs recording processing with same title name.

Figure 7:
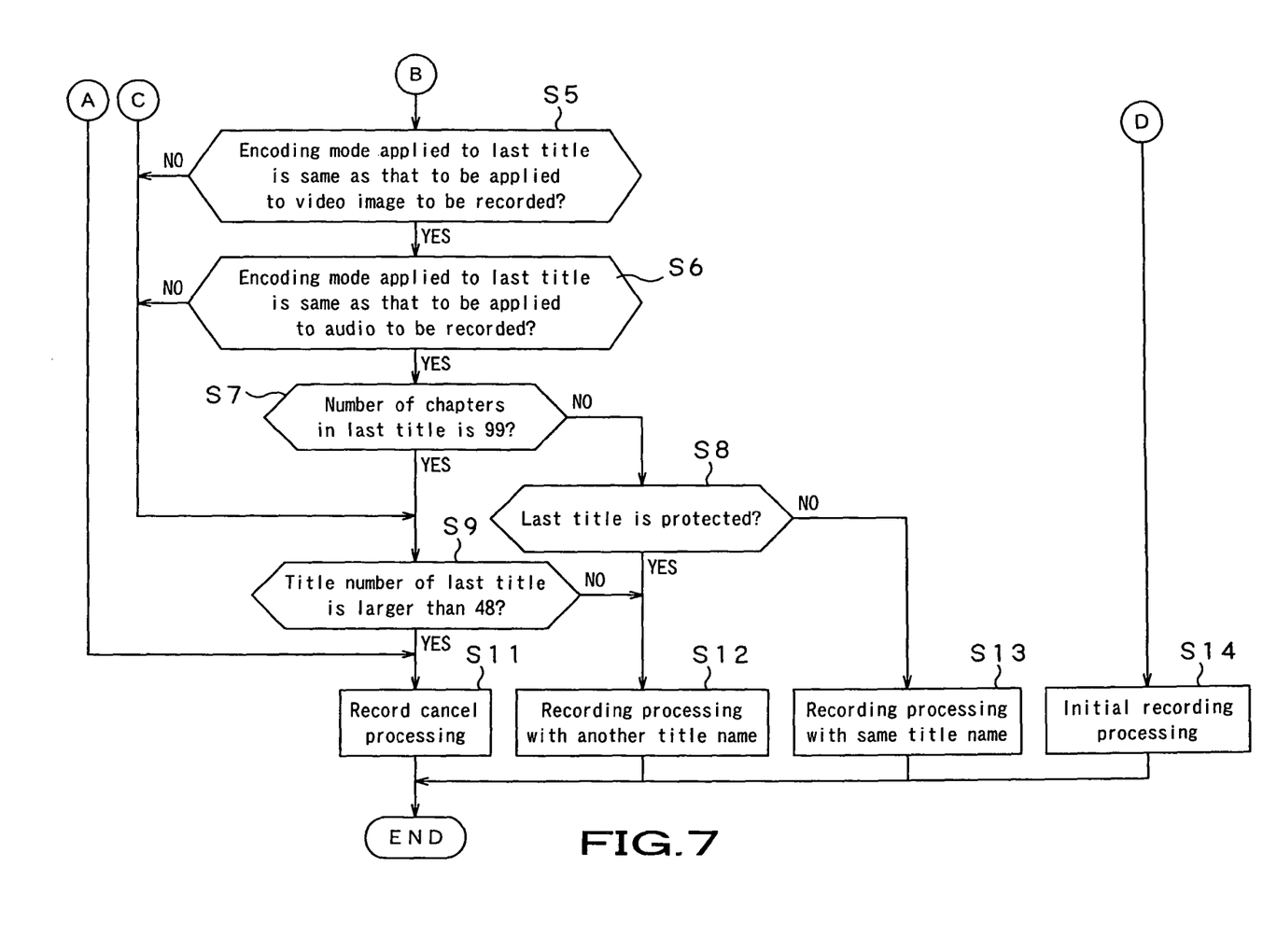
FIG. 7 is a flowchart showing the processing continuing from the steps in FIG. 6.

In step S9, the control section 36 determines whether the title number of the last title has reached the maximum title number (49). That is, the control section 36 determines whether the number of the titles can be increased or cannot be increased any more. When determining that the title number of the last title has reached the maximum title number (49), the control section 36 advances to step S11 and performs record cancel processing. When determining that the title number of the last title has not reached the maximum title number (49), the control section 36 advances to step S12 and performs recording processing with another title name.

In the record cancel processing of step S11, the control section 36 cancels shooting processing and displays a corresponding message including reason for the cancel.

In the recording processing with another title name of step S12, the control section 36 records new encoded data obtained by shooting processing as a new title. At this time, a title number obtained by adding 1 to the title number of the last title is assigned to the new title.

In the recording processing with same title name of step S13, the control section 36 assigns the same number as that of the last title to new encoded data obtained by shooting processing and records the new encoded data as a new chapter included in the last title. At this time, a chapter number obtained by adding 1 to the chapter number of the last chapter is assigned to the new chapter.

In the initial recording processing of step S14, the control section 36 records new encoded data obtained by shooting processing as a new title. At this time, title number 1 is assigned to the new title.

Buffer Cell

In the DVD+RW format, it is specified that data called "Buffer Cell" should be recorded in succession to the physical area of the tail end of the last title. The buffer cell does not include actual information.

Figure 8A:
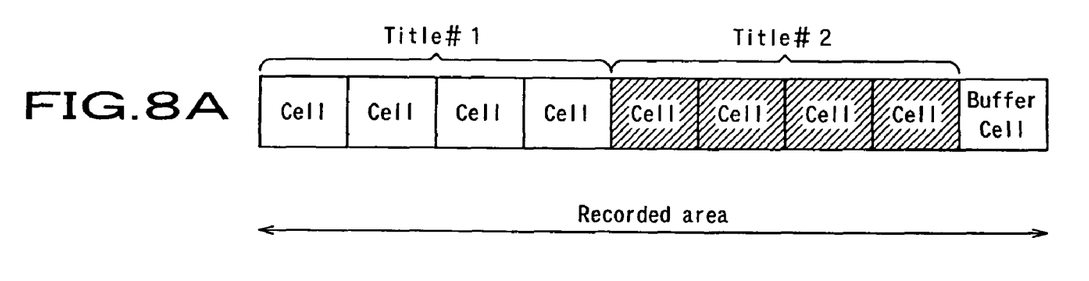
FIGS. 8A to 8C are views for explaining a recording method of a buffer cell.

In a state immediately after the DVD+RW disc 1 is attached to the video camera 10, a buffer cell is recorded in the area immediately after the last title (in this case, title #2), as shown in FIG. 8A.

Figure 8B:
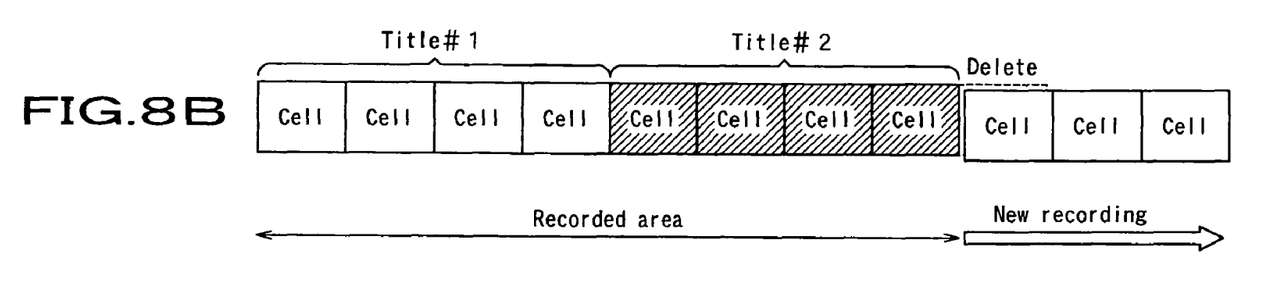
Figure 8C:
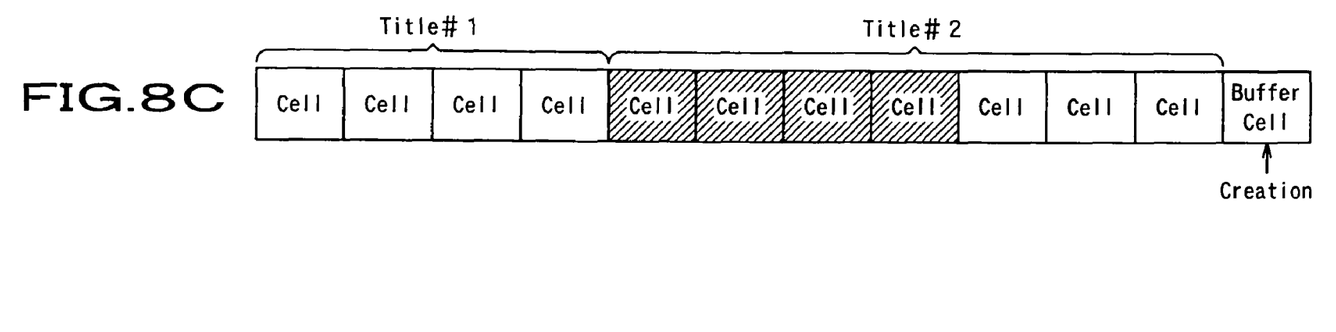

Therefore, in the case where new encoded data is recorded as a chapter continuing from the last chapter of the last title, the video camera 10 records the new encoded data from the starting position of the recorded buffer cell as shown in FIG. 8B. At the time of eject of the disc, a buffer cell is recorded once again in the area immediately after the new encoded data, as shown in FIG. 8C.

Advantage The video camera 10 to which the present invention has been applied records new encoded data onto an optical disc as a chapter included in the last title and continuing from the last chapter of the last title.

As a result, in the video camera 10 to which the present invention has been applied, it is possible to perform a much more number of recording operations in the case where encoded data are recorded onto the DVD+RW disc 1 to thereby effectively utilize the recording area of the optical disc.

It should be understood by those skilled in the art that various modifications, combinations, sub-combinations and alternations may occur depending on design requirements and other factors insofar as they are within the scope of the appended claims or the equivalents thereof.

What is claimed is:

1. An optical disc recording apparatus that records data onto an optical disc that adopts a format in which title and chapter are specified as data management units, the title being a playback unit of contents recorded in contiguous physical areas and the chapter being a unit obtained by dividing the title into a plurality of pieces, comprising:
   record means for receiving contents data as an input, encoding the contents data into a data stream compatible with the format, and recording the encoded data stream onto the optical disc; and
   control means for controlling recording processing for the optical disc, wherein
   the control means records new contents data onto the optical disc in the physical area continuing from the last title of all recorded titles as a chapter continuing from the last chapter included in the last title,
   the control means is configured to encode the input contents data using a plurality of encoding modes and encoding methods,
   in the case where the encoding mode or encoding method of the contents data recorded as the last title and that of new contents data are different from each other, the control means records the new contents data as a new title, and
   in the case where the last title is prevented from being erased or overwritten, the control means records the new contents data as a new title.

2. The optical disc recording apparatus according to claim 1, wherein
   the format specifies that the maximum number of chapters that can be included in one title is N (N is an integer not less than 2), and
   in the case where the number of chapters included in the last title has already reached the N, the control means records the new contents data as a new title.

3. The optical disc recording apparatus according to claim 2, wherein, in the case where the last title is recorded by another optical disc apparatus, the control means records the new contents data as a new title.

4. The optical disc recording apparatus according to claim 1, wherein the optical disc is a DVD+RW disc.

5. An optical disc recording method that encodes contents data and records the encoded contents data onto an optical disc that adopts a format in which title and chapter are specified as data management units, the title being a playback unit of contents recorded in contiguous physical areas and the chapter being a unit obtained by dividing the title into a plurality of pieces, comprising:
   recording new contents data onto the optical disc in the physical area continuing from the last title of all recorded titles as a chapter continuing from the last chapter included in the last title, wherein
   in the case where an encoding mode or encoding method of the contents data recorded as the last title and that of new contents data are different from each other, the new contents data is recorded as a new title, and
   in the case where the last title is prevented from being erased or overwritten, the new contents data is recorded as a new title.

6. The optical disc recording method according to claim 5, wherein
   the format specifies that the maximum number of chapters that can be included in one title is N (N is an integer not less than 2), and
   in the case where the number of chapters included in the last title has already reached the N, the new contents data is recorded as a new title.

7. The optical disc recording method according to claim 6, wherein, in the case where the last title is recorded by another optical disc recording method, the new contents data is recorded as a new title.

8. The optical disc recording method according to claim 5, wherein the optical disc is a DVD+RW disc.

9. A disc recording apparatus with camera comprising:
   imaging means for shooting a subject and encoding the obtained video image signal using a predetermined encoding mode; and disc recording means for recording the imaging data generated by the imaging means onto an optical disc, wherein the disc recording means records data onto an optical disc that adopts a format in which title and chapter are specified as data management units according to the format, the title being a playback unit of contents recorded in contiguous physical areas and the chapter being a unit obtained by dividing the title into a plurality of pieces, in the case where imaging operation is started by the imaging means, the disc recording means records the imaging data onto the optical disc in the physical area continuing from the last title of all recorded titles as a chapter continuing from the last chapter included in the last title, the imaging means is configured to encode the video image signal obtained by the imaging operation using a plurality of encoding modes and encoding methods, in the case where an encoding mode or encoding method of the contents data recorded as the last title and that of imaging data are different from each other, the disc recording means records the imaging data as a new title, and in the case where the last title is prevented from being erased or overwritten, the disc recording means records the imaging data as a new title.

10. The disc recording apparatus with camera according to claim 9, wherein the format specifies that the maximum number of chapters that can be included in one title is N (N is an integer not less than 2), and in the case where the number of chapters included in the last title has already reached the N, the disc recording means records the imaging data as a new title.

11. The disc recording apparatus with camera according to claim 10, wherein, in the case where the last title is recorded by another disc recording apparatus with camera, the disc recording means records the imaging data as a new title.

12. The disc recording apparatus with camera according to claim 9, wherein the optical disc is a DVD+RW disc.

13. An optical disc recording apparatus that records data onto an optical disc that adopts a format in which title and chapter are specified as data management units, the title being a playback unit of contents recorded in contiguous physical areas and the chapter being a unit obtained by dividing the title into a plurality of pieces, comprising:

a record unit that receives contents data as an input, encodes the contents data into a data stream compatible with the format, and records the encoded data stream onto the optical disc; and a control unit that controls recording processing for the optical disc, wherein the control unit records new contents data onto the optical disc in the physical area continuing from the last title of all recorded titles as a chapter continuing from the last chapter included in the last title, the control unit is configured to encode the input contents data using a plurality of encoding modes and encoding methods, in the case where the encoding mode or encoding method of the contents data recorded as the last title and that of new contents data are different from each other, the control unit records the new contents data as a new title, and in the case where the last title is prevented from being erased or overwritten, the control unit records the new contents data as a new title.

14. A disc recording apparatus with camera comprising:

an imaging unit that shoots a subject and encodes the obtained video image signal using a predetermined encoding mode; and a disc recording unit that records the imaging data generated by the imaging unit onto an optical disc, wherein the disc recording unit records data onto an optical disc that adopts a format in which title and chapter are specified as data management units according to the format, the title being a playback unit of contents recorded in contiguous physical areas and the chapter being a unit obtained by dividing the title into a plurality of pieces, in the case where imaging operation is started by the imaging unit, the disc recording unit records the imaging data onto the optical disc in the physical area continuing from the last title of all recorded titles as a chapter continuing from the last chapter included in the last title, the imaging unit is configured to encode the video image signal obtained by the imaging operation using a plurality of encoding modes and encoding methods, and in the case where an encoding mode or encoding method of the contents data recorded as the last title and that of imaging data are different from each other, the disc recording unit records the imaging data as a new title, and in the case where the last title is prevented from being erased or overwritten, the disc recording unit records the new contents data as a new title.

\* \* \* \* \*